No. 625,190. Patented May 16, 1899.
G. NIRISEN.
WASHING MACHINE.
(Application filed Jan. 19, 1899.)
(No Model.)
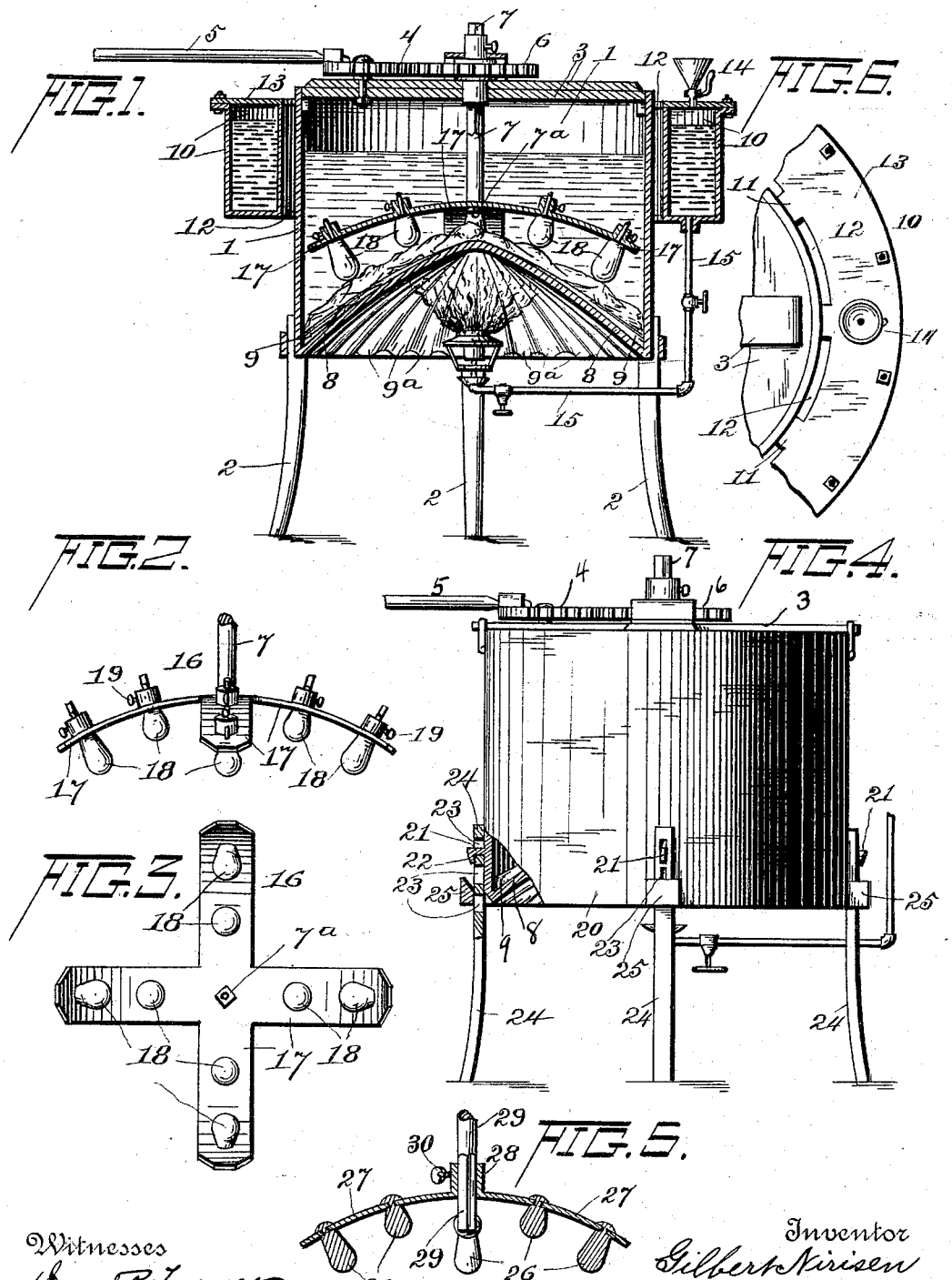

United States Patent Office.

GILBERT NIRISEN, OF WELLSFORD, KANSAS.

WASHING-MACHINE.

SPECIFICATION forming part of Letters Patent No. 625,190, dated May 16, 1899.

Application filed January 19, 1899. Serial No. 702,688. (No model.)

*To all whom it may concern:*

Be it known that I, GILBERT NIRISEN, a citizen of the United States, residing at Wellsford, in the county of Kiowa and State of Kansas, have invented certain new and useful Improvements in Washing-Machines, of which the following is a specification.

This invention relates to washing-machines, and particularly to a combined clothes boiler and washer; and the object of the invention is to provide a machine of improved construction and arrangement of parts.

In the accompanying drawings, forming part of this application, Figure 1 is a central vertical section. Fig. 2 is an elevation of the rubber. Fig. 3 is an inverted plan view of the rubber. Fig. 4 is an elevation of a modification, showing the machine without the oil tank or chamber. Fig. 5 shows modified means for adjusting the rubber. Fig. 6 is a top view, partly broken away, of Fig. 1.

The same numeral references denote the same parts throughout the several figures of the drawings.

The clothes vessel or boiler 1 is supported by legs 2 and has a suitable top or cover 3, provided with a toothed segment 4, having a handle 5, which is operated to turn a pinion 6 on the rubber shaft 7 back and forth to impart motion to the said shaft. The interior of the vessel-bottom 8 is conical and extends upwardly in the vessel and is provided with corrugations 9, which radiate from the center of said bottom and increase in width and depth to the wall of the vessel. The exterior of the bottom has corrugations $9^a$ and is deeply concaved, so that a greater heating-surface is obtained, and owing to the interior conical shape of the bottom greater heat is directed to the center of the vessel and throughout the clothes in the vessel.

The oil tank or chamber 10 extends around the upper portion of the vessel 1 and is connected thereto by means of lugs 11, which hold the chamber off from the vessel to form an intervening opening or space 12 to prevent the oil becoming heated from the heat of the vessel. The oil-chamber has a suitable top or cover 13, provided with a funnel-cock 14 for filling the chamber, and a pipe 15 conducts the oil or other fluid from the chamber to a suitable burner in the concavity of the bottom of the vessel 1.

The rubber 16 is secured to the lower end of the shaft 7 by a nut $7^a$, and consists of a series of diverging arms 17, which curve downwardly from the center of the rubber, each arm having a set or series of rubber prongs 18 secured thereto and depending from the under side of the arms. Said prongs increase in length as they approach the ends of the arms, so as to conform to the shape of the bottom of the vessel 1. The prongs are capable of vertical adjustment by means of thumb-screws 19, so that the space between the ends of the prongs and the bottom of the vessel may be varied according to the amount of articles in the vessel or the character of the articles to be washed.

In Fig. 4 the vessel 20 and the rubber are the same as just described, except that the vessel is provided with projections 21, having depending lips 22, which engage slots 23 in the legs 24, which pass through keepers 25, the edge of the vessel opposite the keepers being beveled to permit the legs being turned inward in adjusting them to vary the height of the vessel. In this figure the oil-tank is omitted.

In Fig. 5 the rubber prongs 26 are fixed to the arms 27, and the latter terminate in a central sleeve 28, adjustably secured to the square end of the shaft 29 by a set-screw 30.

Having thus described my invention, what I claim as new, and desire to secure by Letters Patent, is—

1. The combination, with the vessel having a corrugated bottom, the inner side of which is convexed and the outside concaved, of the rubber comprising a series of downwardly-curved arms, each arm having depending vertically-adjustable prongs, substantially as set forth.

2. The combination, with the clothes vessel having portions of its bottom edge beveled, lipped projections secured to the vessel above the beveled portions, and the keepers upon the vessel, of means for varying the height of the vessel comprising legs having slots engaged by the lipped projections and adapted to be turned against said beveled portions to disengage the said projections, as set forth.

In witness whereof I hereunto set my hand in the presence of two witnesses.

GILBERT NIRISEN.

Witnesses:
HELEN NIRISEN,
W. H. THOMPSON.